Oct. 15, 1968    M. N. MURRAY    3,405,437
METHOD OF MAKING AN ORAL CLEANSER
Original Filed Nov. 10, 1964
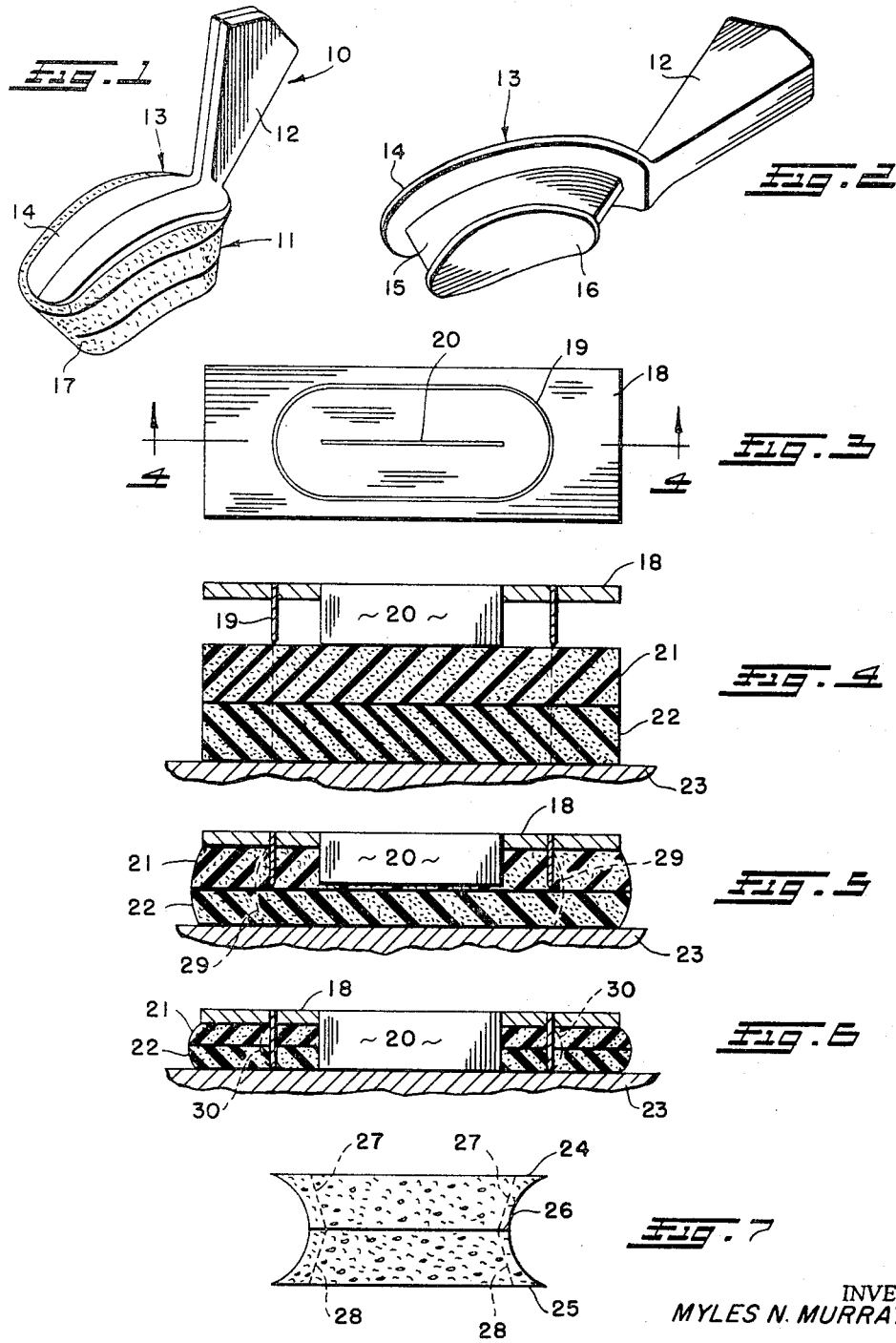
INVENTOR
MYLES N. MURRAY
BY Oberlin, Maky & Donnelly
ATTORNEYS United States Patent Office 3,405,437
Patented Oct. 15, 1968

3,405,437
METHOD OF MAKING AN ORAL CLEANSER
Myles N. Murray, Chagrin Falls, Ohio, assignor to Industrial Electronic Rubber Company, Twinburg, Ohio
Original application Nov. 10, 1964, Ser. No. 410,075, now Patent No. 3,242,519, dated Mar. 29, 1966. Divided and this application Sept. 17, 1965, Ser. No. 488,016
5 Claims. (Cl. 29—450)

ABSTRACT OF THE DISCLOSURE

Molding a rubber holder having a handle part and a curved support extension of general H-shape in cross-section, with the ends of the web of the latter outwardly converging. Cutting a slitted resilient body of general trapezoidal shape by placing one pad of sponge material on another, compressing the pads, and forcing an outer shaping blade and a slitting blade normally through the compressed pads, so that the body blanks when released and the slits as well assume the trapezoidal form. Applying a resilient body to the holder by stretching its slit portion over the outer wall of the support extension and about the web of the same.

---

This is a division of application Ser. No. 410,075, filed Nov. 10, 1964, now Patent No. 3,242,519.

This invention relates to an improved method of making an oral hygiene device intended principally to be applied for cleaning human teeth and also to the manner in which the device is made.

Such device is generally referred to as an oral cleanser, although it has some further utility as hereinafter noted, and it is of the type in which a sponge body or an assembly of strips of sponge material is provided for insertion in the mouth and chewing to effect scrubbing of the teeth. The active sponge part or parts are preferably arranged and supported along an arc conforming loosely to half of the dental arch, with enough working surfaces simultaneously to engage the upper and lower teeth of the half arch fully about the same. A handle is of course provided for inserting and removing the device and, with the approximate size and shape indicated, both sides of the mouth can be cleaned with only two insertions, the device being turned over in being moved from one side to the other.

The known forms for such an oral cleanser have utilized sponge rubber in variously shaped bodies affixed by cementing or the like to a suitable support from which the handle projects. It has developed that such devices are not particularly inexpensive, as compared for example to other more conventional toothbrushes and the like, and the chewing action which produces the desired scrubbing of the teeth does of course in time break down the sponge and necessitate disposal of the entire product. No practical proposal is known to have been made which would provide readily separable support and active components in an assembly permitting the latter, this being the sponge mass which is subject to the attrition, to be removed and replaced with a new component in association with the same support. It is therefore a primary object of the present invention to provide an oral hygiene device of this class, in which this last noted composite character and mode of utilization are realized.

It is also an object of the invention to provide a method of making a new form of assembly for such an oral cleanser in which a single body of the active material provides, in association with a separable holder, surfaces for substantially full engagement simultaneously with all exposed surfaces of both the upper and lower teeth about approximately half of the dental arch.

Another important object of the invention is to provide an extremely facile and practical method of manufacture of sponge bodies to be used as the active components in oral devices of the class discussed.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view of a new oral hygiene device in accordance with the present invention;

FIG. 2 is a further perspective view, on a slightly enlarged scale, of the holder component of the device;

FIG. 3 is a view of a cutter assembly used in the manufacture of the sponge or active body of the oral device, with this assembly being shown on edge and thus viewed in this figure from the bottom;

FIG. 4 is a cross-sectional view of the noted cutter assembly in working opposition to a representative support on which two pads of sponge rubber are placed in superimposed relation for cutting to produce the particular body needed for the oral hygiene device;

FIG. 5 is a view of the same assembly in FIG. 4, but showing the condition in which the cutting device has been forced to penetrate approximately the top sponge pad;

FIG. 6 is a similar view in which the cutting assembly has been fully forced through both of the sponge pads, this being the terminal condition in the cutting operation before retraction of the cutting assembly; and FIG. 7 is a side elevation of the section produced by the steps illustrated in FIGS. 4–6, this section comprising two bodies respectively cut from the sponge pads.

Referring now to the drawings in detail, the device shown in FIG. 1 basically comprises a holder 10 and an active body section 11 detachably associated with such holder. The holder 10 is shown separately in FIG. 2 and will be seen therefrom to comprise, as parts of a single piece preferably made by rubber molding, a fairly heavy generally triangular handle 12 and an integral arcuate extension 13 which is of general H-shape in radial cross-section.

The support extension 13 thus is formed with a curved vertical outer wall 14, with the handle 12 projecting angularly from one end of this wall as illustrated in a plane substantially normal to the axis of the curvature of the wall 14. At the inner surface of the wall 14, approximately along the longitudinal center thereof, there is an inwardly projecting horizontal web 15 having tapered ends as shown to provide a reduction of the arcuate length as compared to the outer wall 14. The support extension 13 is completed by a vertical inner wall 16 integral with the reduced end length of the web portion 15 and projecting equally above and below the latter. This inner wall 16 is only slightly longer than the edge of the web portion at which it is joined to the same, and thus of noticeably smaller extent than the outer wall 14. The vertical inner and outer walls are approximately concentric and the end wall 16 has its ends noticeably rounded, so that the projection thereof in a plane would be elliptical, for a purpose to be later explained.

A comparison of FIGS. 1 and 2 will clearly show that the active body component 11 of the device is formed as a second single piece in such manner as to be fitted over the support extension 13 and sufficiently fixed in place for the chewing action earlier discussed, while being removable for disposal and replacement with another body of similar formation. This active component 11 preferably will be spongy and made, for example, from a high purity sponge rubber such as silicone sponge. With further regard to materials, the holder 10 can be readily molded of silicone rubber in the proportions shown, with the degree of resilience desired for its indicated support and handling functions.

When assembled with the holder 10, the sponge 11 is generally trapezoidal in longitudinal section. The sponge is provided with a center slit, between its outer faces, permitting this body to be stretched over the inner wall 16, the elliptical shape of the latter facilitating such operation, and thus disposed to extend fully about the web 15 between the side walls 14 and 16. On each of its exposed long sides, that is, at the top and bottom of the assembled device, the sponge body is provided with a lengthwise extending groove, such as appears at 17 in FIG. 1. It will be obvious that these body grooves accommodate respectively the upper and lower teeth of the user of the device in resilient resisting penetration, with all teeth engaged at all exposed surfaces of the same over the half dental arch.

The dimensions of the sponge body 11 relative to the holder 10 are of course such that the former can be sufficiently stretched outwardly of its center slit for passage over the inner wall 16 of the holder. The thus accomplished engagement about the web 15 will maintain sufficient tension in the body to hold the same firmly in place, while still permitting the ready removal thereof when it is desired to discard the particular sponge because of wear or any other reason.

With regard now to the method of making the sponge body for such oral cleansers, the steps are illustrated in the remaining figures in which the apparatus is more or less schematically shown as needed for producing a single body. Actually, as will appear, this illustrative operation produces two separate bodies, and the distinction being made here is that between a single operating sequence and multiplication by increasing the number of cutters operable in the same head structure and the like. The individual cutter used comprises a mounting board 18 having a first continuous blade 19 projecting downwardly from one side of the board in the general shape of a rectangle with rounded ends. Within this continuous outer blade 19, there is a centered straight blade 20 which is approximately the same length as the straight sides of the blade 19. Both blades have lower or outer knife edges and project approximately the same distance from the same side of the cutting board 18.

Two pads 21 and 22 of the sponge material to be used, such as the aforenoted silicone sponge, are placed on a relatively fixed support, such as the representative table 23, with one resting on the other in register. The mounting board 18 of the cutter assembly is brought in parallel opposition to the support 23 above the top pad 21, with its blades of course projecting downwardly, and force is applied to the top of the cutting board sufficient to drive the blades fully through the two pads.

The projection of the blades 19 and 20 is less than the normal uncompressed total thickness of the two sponge pads 21 and 22, and the latter are not peripherally restrained. The result of these conditions is that the pads are substantially compressed in the cutting operation as shown in the progression apparent in FIGS. 4, 5 and 6. It will thus be appreciated that the blades cut through the sponge pads or layers while the latter are undergoing deformation, so that the actual lines of cutting are not normal to the planes of the pads upon release by full withdrawal of the cutter assembly.

In FIG. 7, there is illustrated the slug cut by the foregoing operation and it will be seen that this actually provides two mirror image sponge bodies 24 and 25 which, while still superimposed, have definitely convex ends and the smallest length occurring at the interface 26. Moreover, the slit cut by the center blade 20 will also be tapered from each of the top and bottom faces inwardly toward this parting or separation line 26, the ends of the slit in the body 24 being indicated by the dashed lines 27 and those of the slit in the body 25 by the dashed lines 28. Accordingly, simply separating this slug of FIG. 7 provides two sponge bodies each having both the desired generally trapezoidal longitudinal section and a tapered center slit which roughly corresponds to the outer taper.

The sponge bodies thus produced, in the form shown by the bodies 24 and 25, have fairly sharp outer edges, and it is preferred that these be removed, for example, by tumbling or any suitable abrading expedient in order to provide the rounding of the edges apparent in the finished product shown in FIG. 1. Each of the sponge bodies thus produced is also grooved to provide the side face center slots 17 as earlier discussed, with this operation capable of being performed by a simple power saw.

It will be appreciated that the method described above requires only the simplest of apparatus and uniquely relies upon cutting the body blanks while the pads from which they are cut are deformed. The pads can therefore be of standard stock and cutters in the usual and preferred normal relation to the work can be utilized. Moreover, two bodies are produced by each cutter in this operation and the only further work to be done is the equally easy side grooving and abrasion of sharp edges. In FIGS. 5 and 6, the dashed lines 29 and 30, respectively, are projections of the initial undistorted cutting plane and show, together of course with the curvature of the ends of the sponge pads, the extent to which the cutting stroke which would obtain in a normal operation without compression is distorted. In production apparatus, the head will be provided with a plurality of cutters similar to the one described and large pads will be used, in order to produce a multiplicity of the paired sponge bodies in each cycle.

It will now be obvious that the present improvements concern particularly the two-part nature of the new oral hygiene device, the form of the sponge, and the preferred method of producing the latter. The manner of use of the device has already been discussed, and any material of requisite purity and resilient character on the order set forth can be employed, whether rubber, plastic or the like. The sponge is significant not only in the resiliency utilized for the scrubbing of the teeth, but also as a labyrinthine or cellular body to produce a hydraulic flushing action to reach inaccessible regions in the mouth in the use of the device, a dentifrice normally being used for the cleansing and being dischargeable from the cells of the sponge to flow over the teeth and gums of the user.

The device can also be used for applying medication, for example, for treatment of mouth diseases, and the sponge bodies can be originally furnished either with or without the particular additive already incorporated. The holder can be made of a material other than rubber, for example, a suitable synthetic resin, with its significant features in respect of choice of material being primarily related to stiffness, ease of fabrication, and ability to support the sponge in the intended use of the device.

Other modes of applying the principle of the invention may be employed, change being made as regards the details described, provided the features stated in any of the following claims or the equivalent of such be employed.

I, therefore, particularly point out and distinctly claim as my invention:

1. The method of making a disposable sponge for an oral hygiene device of the character described, which comprises the steps of placing two pads of sponge stock on a support with one on the other, relatively advancing a cutter assembly on the two thus supported pads, with the cutter assembly providing a continuous outer cutting shape in the direction of the advance and an inner slitting shape, driving such cutter assembly through the pads while compressing the latter to distort the normal lines of cutting, the distortion being such as to produce from the pads two sponge bodies which have normally tapered ends when released from such compression and generally corresponding tapered slits between their respective faces of unequal length.

2. The method set forth in claim 1, in which the two sponge bodies are subsequently separated for independent use and subjected to an abrading action to round original sharp edges of the same.

3. The method of making an oral hygiene device, which comprises the steps of forming a holder having a handle part and a support extension which is of general H-shape in cross-section, said extension thereby having a web and adjoining inner and outer walls projecting to both sides of the same, with the ends of such web being tapered respectively inwardly from the inner to the outer wall, cutting from a pad of sponge material a resilient body corresponding in shape to said support extension and providing a generally centered slit in the body having ends which are tapered correspondingly as the ends of the web of the support extension, and applying the resilient body to the holder exension by stretching the slit portion of the former over the outer wall of the latter and about the web between the inner and outer walls.

4. The method of claim 3, including producing two resilient bodies at the same time by supporting two pads of the sponge material with one placed on the other, compressing the pads and cutting through both while compressed in an action normal to their surfaces to sever the bodies from the pads, with the cut bodies released and assuming normal generally trapezoidal shapes.

5. The method of claim 4, including cutting the slits in the two bodies in the severing of the same from the compressed pads, the ends of the slits thereby becoming tapered when the bodies assume their normal shapes.

References Cited

UNITED STATES PATENTS

| 1,631,133 | 6/1927 | Jones | 15—244 |
|---|---|---|---|
| 1,962,875 | 6/1934 | Reber. | |
| 2,111,238 | 3/1938 | Doyle | 15—188 |
| 2,251,135 | 7/1941 | Iknayan et al. | 83—19 |
| 2,323,568 | 6/1943 | Rogers | 15—244 |
| 2,375,518 | 5/1945 | Bolle | 83—19 |
| 2,491,274 | 12/1949 | McNeill | 15—244 XR |
| 2,915,768 | 12/1959 | Hall | 15—244 |
| 3,105,263 | 10/1963 | Ginter | 15—244 |

FOREIGN PATENTS

| 291,675 | 6/1928 | Great Britain. |
|---|---|---|
| 723,815 | 1/1932 | France. |

CHARLIE T. MOON, *Primary Examiner.*